(12) United States Patent
Wilshaw et al.

(10) Patent No.: US 10,451,083 B2
(45) Date of Patent: Oct. 22, 2019

(54) COMPRESSOR

(71) Applicant: ROLLS-ROYCE plc, London (GB)

(72) Inventors: Johnathan H. Wilshaw, Barlaston (GB); Crispin D. Bolgar, Nottingham (GB)

(73) Assignee: ROLLS-ROYCE plc, London (GB)

( * ) Notice: Subject to any disclaimer, the term of this patent is extended or adjusted under 35 U.S.C. 154(b) by 350 days.

(21) Appl. No.: 15/290,476

(22) Filed: Oct. 11, 2016

(65) Prior Publication Data
US 2017/0108006 A1 Apr. 20, 2017

(30) Foreign Application Priority Data
Oct. 19, 2015 (GB) .................... 1518448.4

(51) Int. Cl.
*F04D 29/54* (2006.01)
*F01D 25/24* (2006.01)
*F02C 6/08* (2006.01)

(52) U.S. Cl.
CPC ......... *F04D 29/547* (2013.01); *F01D 25/243* (2013.01); *F02C 6/08* (2013.01); *F04D 29/542* (2013.01); *F05D 2220/32* (2013.01); *F05D 2240/12* (2013.01); *F05D 2240/14* (2013.01); *F05D 2240/30* (2013.01); *F05D 2250/314* (2013.01); *F05D 2250/324* (2013.01); *F05D 2250/38* (2013.01); *F05D 2250/71* (2013.01)

(58) Field of Classification Search
CPC .... F04D 29/547; F04D 29/542; F01D 25/243; F02C 6/08; F05D 2250/71; F05D 2250/38; F05D 2250/324; F05D 2250/314; F05D 2240/30; F05D 2240/14; F05D 2240/12; F05D 2220/32

See application file for complete search history.

(56) References Cited

U.S. PATENT DOCUMENTS

| 3,142,438 A * | 7/1964 | Bathgate ............. F04D 27/0215 415/144 |
| 4,844,689 A | 7/1989 | Seed |
| 6,783,324 B2 * | 8/2004 | Muny .................... F01D 25/246 415/116 |
| 7,090,462 B2 * | 8/2006 | Martin .................... F01D 11/18 415/144 |

(Continued)

FOREIGN PATENT DOCUMENTS

| CA | 2 048 829 A1 | 5/1992 |
| WO | 2013/192055 A1 | 12/2013 |

OTHER PUBLICATIONS

Mar. 23, 2016 Search Report issued in Great Britain Patent Application No. 1518448.4.

(Continued)

*Primary Examiner* — Richard A Edgar
(74) *Attorney, Agent, or Firm* — Oliff PLC

(57) ABSTRACT

A compressor section for a gas turbine engine, the compressor section including a circumferential row of stator vanes, a circumferential row of rotor blades, and a casing arrangement. A row of bleed ports are provided in the casing arrangement. Each of the bleed ports extends radially and is curved such that an outlet of the port is rearward of and is circumferentially offset in a direction of rotation of the rotor blades from an inlet of the port.

12 Claims, 3 Drawing Sheets

(56) References Cited

U.S. PATENT DOCUMENTS

| | | | |
|---|---|---|---|
| 7,094,029 B2* | 8/2006 | Taylor | F01D 11/14 |
| | | | 415/213.1 |
| 7,624,581 B2* | 12/2009 | Moniz | F01D 17/105 |
| | | | 60/226.1 |
| 2013/0340440 A1 | 12/2013 | LeBlanc et al. | |
| 2014/0096536 A1 | 4/2014 | Travis et al. | |
| 2014/0271108 A1* | 9/2014 | Duong | F01D 5/145 |
| | | | 415/1 |
| 2016/0123187 A1* | 5/2016 | Leslie | F01D 25/145 |
| | | | 415/134 |

OTHER PUBLICATIONS

Mar. 7, 2017 European Search Report issued in European Patent Application No. 16193032.

* cited by examiner

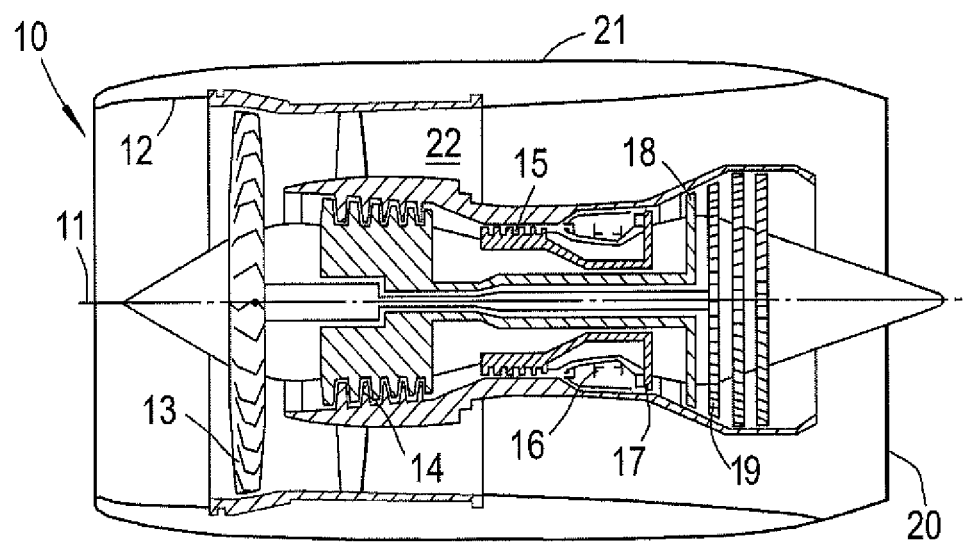
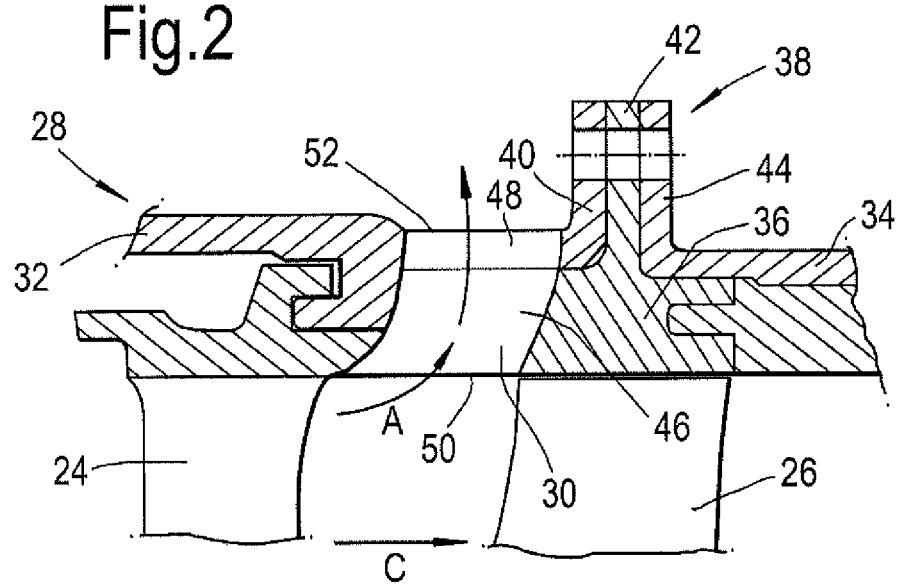

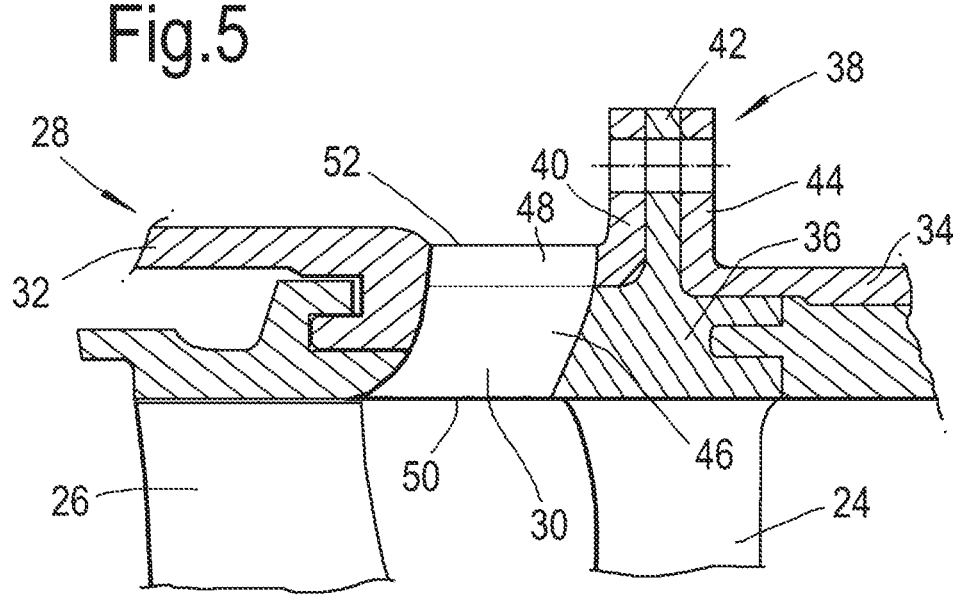

COMPRESSOR

TECHNICAL FIELD

The present disclosure concerns a compressor section and/or a gas turbine engine.

BACKGROUND

A gas turbine engine typically comprises a series of rotatable components, both in the compressor and turbine of the engine, which are housed within a casing. The rotatable components each comprise an array of blades, each having an aerofoil cross section. The blades are attached to a central hub or drum. The blades of the rotatable components accelerate the air through the engine and/or extract energy from the air. Each of the rotatable components are coupled with a static component which comprises an array of vanes that are also of aerofoil cross section. The static components are connected to the radially inner and/or outer casing components.

Typically air is bled from the compressor to provide cooling and sealing air to the turbine. Air can be bled from the compressor using one or more bleed ports. The bleed ports may be annular ports that extend circumferentially around the casing of the compressor. Alternatively, a series of discrete bleed ports may be provided circumferentially around the casing.

The use of bleed ports is important for cooling and sealing, but the provision of such holes can be a cause of aerodynamic losses.

SUMMARY

The present disclosure seeks to minimise the total pressure losses associated with the provision of bleed holes.

According to a first aspect there is provided a compressor section for a gas turbine engine. The compressor section comprises a circumferential row of stator vanes, a circumferential row of rotor blades, and a casing arrangement. The casing arrangement may be configured such that the rotors pass the casing arrangement during rotation in one axial region and the stator vanes are connected to the casing arrangement in another axial region. A row of bleed ports are provided in the casing arrangement, wherein each of the bleed ports extends radially and is curved such that an outlet of the port is rearward of and is circumferentially offset in a direction of rotation of the rotor blades from an inlet of the port.

In the present application, a forward and rearward direction is with respect to the axial flow of air through a gas turbine engine.

Each of the bleed ports may be configured to have a larger cross section at the outlet than at the inlet. For example, the bleed ports may be considered as divergent bleed ports. An inner surface of the port may be continuous between the inlet and the outlet, e.g. to diffuse the air flow through the port.

The outlet may be larger than the inlet in a circumferential and/or axial direction.

The bleed ports may have a circular or oval cross section.

The bleed ports may be provided axially adjacent to and forward of the row of rotor blades. Alternatively, the bleed ports may be provided axially adjacent to and rearward of the row of rotor blades.

The bleed ports may be provided axially rearward of the stator vanes.

The casing arrangement may circumscribe the row of stator vanes and the row of rotor blades.

The bleed ports may extend radially outwardly through the casing arrangement.

The casing arrangement may include a rotor casing proximal to the rotors and a stator casing to which the stator vanes are connected. The bleed ports may extend through both the stator casing and the rotor casing.

The bleed ports in the rotor casing may be co-axial to the bleed ports in the stator casing.

The rotor casing may include a rotor casing portion having a flange. The stator casing may include at least two stator casing portions each having a flange. The rotor casing portion flange may be positioned between and connected to the flanges of the two stator casing portions.

The bleed port may be provided adjacent to the flange of one of the stator casing portions.

An exit diffuser may be provided at the outlet of each of the bleed ports.

The casing arrangement may include a stator casing, and the exit diffuser may be connected to the stator casing.

The exit diffuser may be defined by a plurality of members that are wider at a position adjacent the outlet of the bleed port and narrower at the outlet of the diffuser. For example, the members that define the exit diffusers may be substantially triangular in radial cross section.

The ratio of the width of an outlet to the width of an inlet of the exit diffuser may be greater than the ratio of the width of the outlet to the width of the inlet of the bleed ports.

The compressor section may include a plurality of circumferential rows of stator vanes and a plurality of circumferential rows of rotor blades, each row of stator vanes being axially adjacent a row of rotor blades. Bleed holes may be provided at a single axial location, e.g. in a region of only one of the rows of stator vanes and rotor blades. Alternatively, bleed holes may be provided at multiple axial locations, e.g. in a region of two or more rotor blades and stator vanes.

According to a second aspect there is provided a compressor section for a gas turbine engine. The compressor section comprising a circumferential row of stator vanes, a circumferential row of rotor blades, and a rotor casing circumscribing the rotor blades and a stator casing circumscribing the stator vanes and to which the stator vanes are connected. The rotor casing includes a rotor casing portion having a flange, and the stator casing includes at least two stator casing portions each having a flange, and wherein the rotor casing portion flange is positioned between and connected to the flanges of the two stator casing portions.

The compressor section may comprise a plurality of bleed ports, and the bleed ports may be provided adjacent to the flange of one of the stator casing portions.

The bleed ports may be provided upstream of the flanges of the rotor and stator casing portions. The bleed ports may be adjacent to and upstream of the rotor blades. The flanges may be substantially axially aligned with the rotor blades.

The compressor section of the second aspect may have one or more features of the compressor section of the first aspect.

According to a third aspect there is provided a gas turbine engine comprising the compressor section of the first aspect and/or second aspect.

The high pressure compressor section may be the compressor section of the first and/or second aspect.

According to a fourth aspect there is provided a method of manufacturing a compressor section for a gas turbine engine. The method comprises providing a casing arrangement and connecting a circumferential row of stator vanes to the casing arrangement. A circumferential row of rotor blades is arranged such that they pass the casing arrangement during rotation. The method further comprises providing a row of bleed ports in the casing arrangement, wherein each of the bleed ports extends radially and is curved such that an outlet of the port is rearward of and is circumferentially offset in a direction of rotation of the rotor blades from an inlet of the port.

The bleed ports may be defined using machining.

The compressor section may be the compressor section of the first and/or second aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which:
FIG. 1 is a sectional side view of a gas turbine engine;
FIG. 2 is a sectional view through a portion of a compressor section of the gas turbine engine of FIG. 1;
FIG. 5 is a sectional view through a portion of a compressor section of the gas turbine engine of FIG. 1.

DETAILED DESCRIPTION

Figure 3:
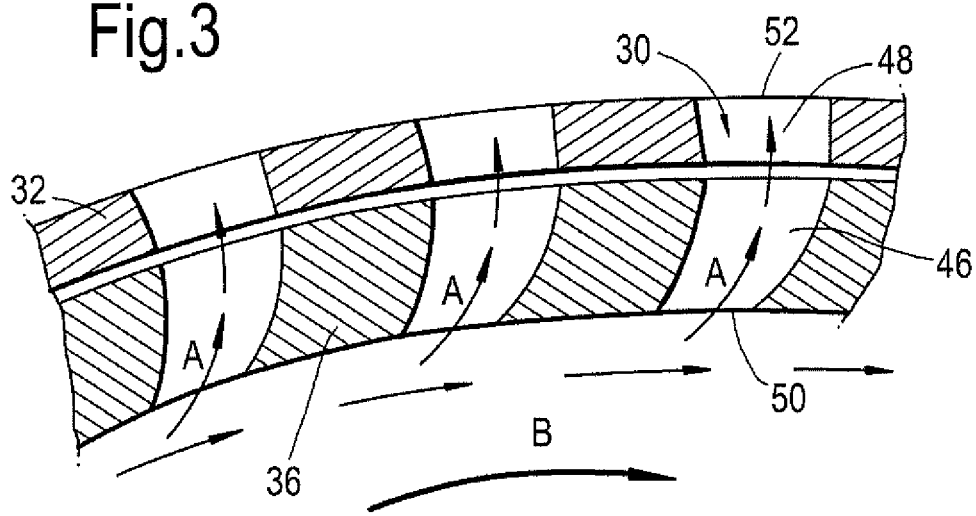
FIG. 3 is a cross sectional view through a portion of a casing arrangement of the compressor section of FIG. 2.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations, By way of example such engines may have an alternative number of interconnecting shafts (e.g. two) and/or an alternative number of compressors and/or turbines. Further the engine may comprise a gearbox provided in the drive train from a turbine to a compressor and/or fan.

Referring now to FIGS. 2 and 3, the high pressure compressor includes a plurality of rows of stator vanes 24 and a plurality of rows of rotor blades 26. The rows of blades and vanes are arranged circumferentially and each row of rotor blades has a row of stator vanes associated with it. Each of the stator vanes and rotor blades has a portion that has an aerofoil profile. The rotor blades are connected to a hub (not shown in FIG. 2 or 3), e.g. mounted or welded thereto.

A casing arrangement 28 circumscribes the stator vanes 24 and the rotor blades 26. The stator vanes 24 are connected to the casing arrangement. A plurality of bleed holes 30 are provided in the casing arrangement and extend radially through the casing arrangement. In the present example, the bleed holes are provided just upstream of the seventh row of rotor blades. However, in alternative embodiments the bleed holes may be provided upstream of any one or more rotor stages of the compressor.

In the present example, the casing arrangement includes a stator casing (including stator casing portions 32 and 34) and a rotor casing 36. Each of the rotor casing and stator casing are made from a plurality of axial sections that are connected together. The rotor casing 36 provides a surface past which the rotor blades pass during operation. The stator vanes 24 are connected to the stator casing.

The stator casing portions 32, 34 are connected to the rotor casing 36 using a flange arrangement 38. Each of the stator casing portions and the rotor casing includes a flange 40, 42, 44 that extends radially outwardly from the respective casing. In the present example, the flanges are in an axial position corresponding to one of the row of rotor blades 26 (e.g. are axially aligned with the rotor blade). In the region of the flange, the rotor casing is positioned radially inward of the stator casing. The flange 42 of the rotor casing is received between the flanges 40, 44 of the stator casing portions and the flanges are fixed in position using a fastener, e.g. one or more bolts.

As shown in FIG. 3, the bleed ports 30 are positioned forward (e.g. upstream) of the flange arrangement 38 and are axially adjacent the flange 40 of one of the stator casing portions 32. The bleed ports 30 may be provided axially adjacent to and forward of the row of rotor blades 26. Alternatively, as shown in FIG. 5, the bleed ports 30 may be provided axially adjacent to and rearward of the row of rotor blades 26.

Each of the bleed ports 30 are defined by a port 46 formed in the rotor casing and a port 48 formed in the stator casing. The ports formed in the rotor casing are aligned with (e.g. coaxial with) the ports formed in the stator casing, so as to form a continuous bleed port. The ports 46 and 48 may be considered to be through holes in the respective rotor casing and stator casing.

Each bleed port 30 is profiled so as to curve in a radial direction from an inlet 50 to an outlet 52 of the bleed port. To achieve this curve both or one of the ports 46, 48 formed in the rotor casing and stator casing may be curved. As can be seen from FIG. 2, the ports are curved such that an inlet of the port is axially forward of an outlet of the port (e.g. the ports are curved in an axial direction C of air flow through the compressor). As can be seen from FIG. 3, the ports are also curved such that the outlet of the port is circumferentially offset from the inlet of the port in a direction of rotation B of the rotors (e.g. the ports are curved in a direction of rotation of the rotor blades). The cross sectional area of the bleed port 30 at any point may be circular or oval.

The bleed ports 30 are also arranged to diffuse the flow through the bleed port. The inlet 50 to the bleed ports is smaller than the outlet 52 to the bleed ports. The bleed ports are arranged so that an inner surface of the port is continuous between the inlet and the outlet.

Figure 4:
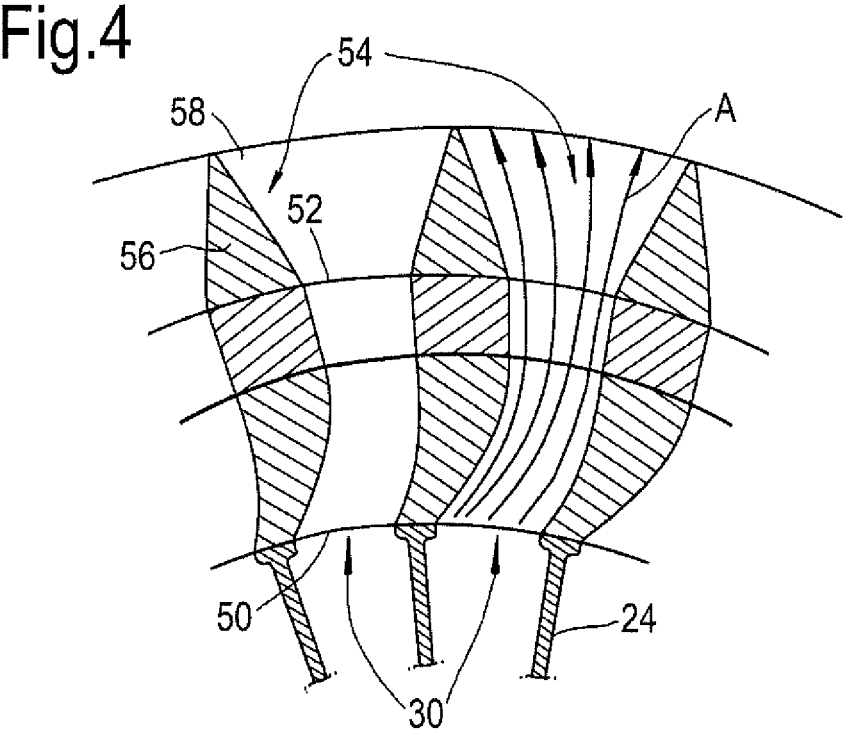
FIG. 4 is an cross sectional view through a portion of a casing arrangement of an alternative compressor section.

Referring to FIG. 4, in an alternative example of a compressor section, the bleed ports include an exit diffuser 54. The diffuser is defined by members 56 connected to an outer surface of the stator casing (portion 32). The members 56 are arranged so that an outlet 58 of the diffuser is larger than the outlet 52 of the port. The members 56 converge substantially to a point so that the outlets of the diffusers are adjacent each other with a minimal width wall separating them. In this example, the members are substantially triangular in radial cross section.

During use, air flow through the compressor section is bled through the bleed holes 30 and is directed to the turbine for sealing, cooling and/or other suitable purposes. The arrows (some labelled A) in FIGS. 2 to 4 indicate the flow of air through the bleed holes.

The use of the described bleed ports increases static pressure of the bleed from the compressor. The profile of the bleed ports remove swirl from the bleed flow and diffuses the flow to increase the static pressure, which can contribute to improved aerodynamic efficiency of a gas turbine engine.

The use of a "triple flange", that is the connection of the rotor casing flange to the flanges of the stator casing portions means that the profile of the bleed ducts can be more easily produced (e.g. machined) in the rotor and stator casings.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A compressor section for a gas turbine engine, the compressor section comprising:
   a circumferential row of stator vanes;
   a circumferential row of rotor blades;
   a casing arrangement configured such that the rotor blades pass the casing arrangement during rotation in a first axial region and the stator vanes are connected to the casing arrangement in a second axial region;
   a row of bleed ports provided in the casing arrangement, each of the bleed ports extending radially, each of the bleed ports being curved such that an outlet of each respective bleed port is rearward of an inlet of the respective bleed port, and the outlet of each respective bleed port is circumferentially offset in a direction of rotation of the rotor blades from the inlet of the respective bleed port; and
   an exit diffuser disposed at the respective outlet of each of the bleed ports, wherein, for each respective bleed port of the bleed ports, a ratio of a width of an outlet of the exit diffuser to a width of an inlet of the exit diffuser is greater than a ratio of a width of the outlet of the respective bleed port to a width of the inlet of the respective bleed port.

2. The compressor section according to claim 1, wherein each of the bleed ports is configured to have a larger cross section at the outlet than a cross section at the inlet.

3. The compressor section according to claim 2, wherein the outlet is larger than the inlet in a circumferential or axial direction.

4. The compressor section according to claim 1, wherein the bleed ports are provided axially adjacent to and forward of the row of rotor blades.

5. The compressor section according to claim 1, wherein the casing arrangement includes a rotor casing proximal to the rotor blades and a stator casing to which the stator vanes are connected, and the bleed ports extend through both the stator casing and the rotor casing.

6. The compressor section according to claim 5, wherein channels defining the bleed ports in the rotor casing are co-axial to channels defining the bleed ports in the stator casing.

7. The compressor section according to claim 5, wherein:
   the rotor casing includes a rotor casing portion having a flange, and the stator casing includes at least two stator casing portions each having a flange, and
   the flange of the rotor casing portion is positioned between and connected to the flanges of the at least two stator casing portions.

8. The compressor section according to claim 7, wherein the bleed ports are provided adjacent to the flange of one of the stator casing portions.

9. The compressor section according to claim 1, wherein the casing arrangement includes a stator casing, and the exit diffuser is connected to the stator casing.

10. A gas turbine engine comprising the compressor section according to claim 1.

11. The gas turbine engine according to claim 10, wherein the compressor section is a high pressure compressor.

12. The compressor section according to claim 1, wherein the bleed ports are provided axially adjacent to and rearward of the row of rotor blades.

* * * * *